United States Patent [19]

Tenney

[11] Patent Number: 5,638,579
[45] Date of Patent: Jun. 17, 1997

[54] FRICTION TILT MECHANISM

[76] Inventor: Kenneth B. Tenney, 2601 Cedar Cir., Winchester, Va. 22601

[21] Appl. No.: 708,727

[22] Filed: Sep. 5, 1996

[51] Int. Cl.$^6$ .............................. E05C 17/64; E05D 11/08
[52] U.S. Cl. ..................... 16/338; 248/185.1; 248/291.1; 16/342
[58] Field of Search .............................. 16/338, 337, 341, 16/342, 340, 329, 330, 335; 248/176, 185, 278, 291, 919–923

[56] References Cited

U.S. PATENT DOCUMENTS

| 375,051 | 12/1887 | Davis | 16/338 |
|---|---|---|---|
| 379,901 | 3/1888 | Mix | 16/338 |
| 1,487,081 | 3/1924 | Walts | 16/338 |

FOREIGN PATENT DOCUMENTS

| 1037237 | 7/1966 | United Kingdom | 16/338 |
|---|---|---|---|
| 1039036 | 8/1966 | United Kingdom | 16/338 |

*Primary Examiner*—Chuck Y. Mah
*Attorney, Agent, or Firm*—James F. Cottone

[57] ABSTRACT

A friction tilt mechanism is specially configured to provide precisely controllable tilt angles to devices requiring smooth and stable angular adjustability, by virtue of employing one or more unique frictional tilt devices. Each friction tilt device includes a pair of bronze bearing blocks, one responsive to precisely applied compressive forces to produce user controllable amounts of static and rotational friction to the tilt axis. When a pair of the friction tilt devices are arranged on a support adapted to carry a flat panel display, smooth and precise viewing angle adjustments are readily accomplished and stably retained for a wide range of display weights.

20 Claims, 1 Drawing Sheet

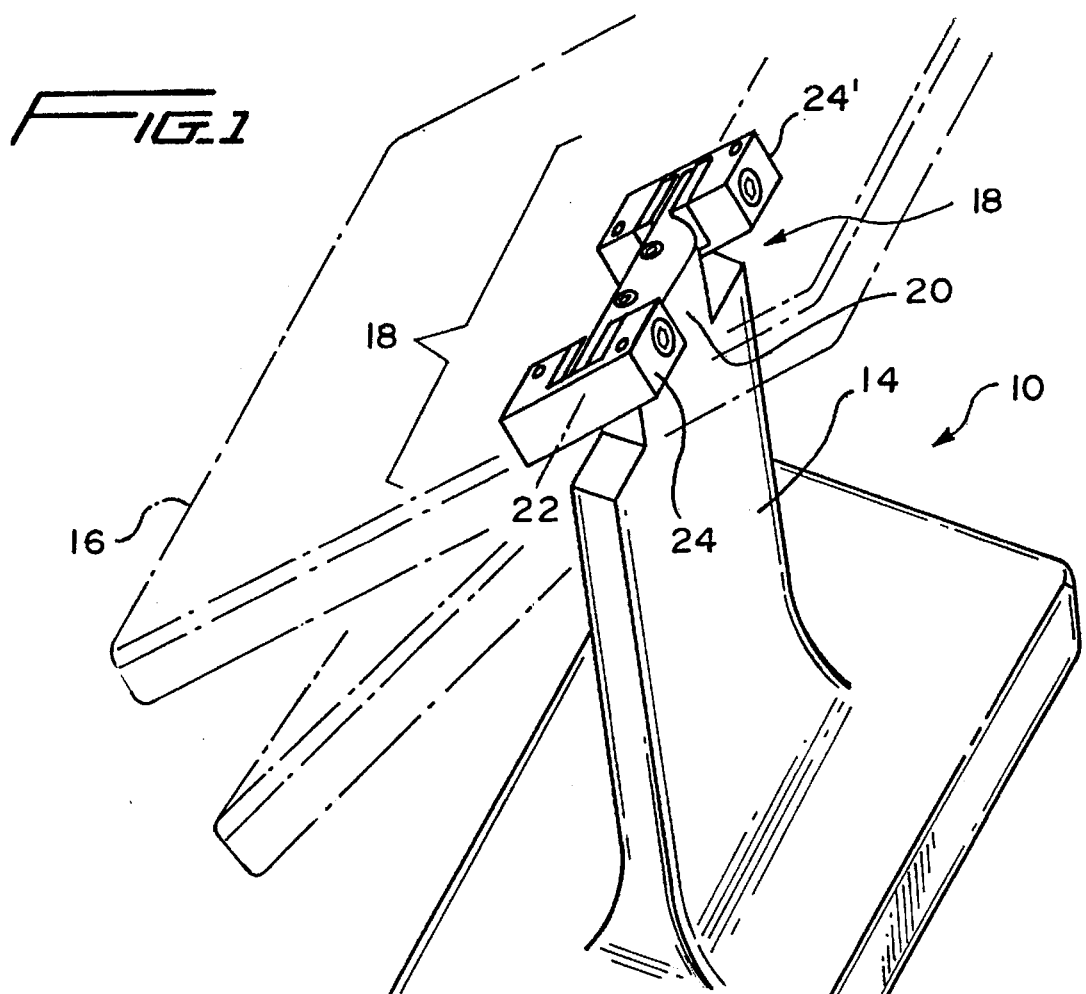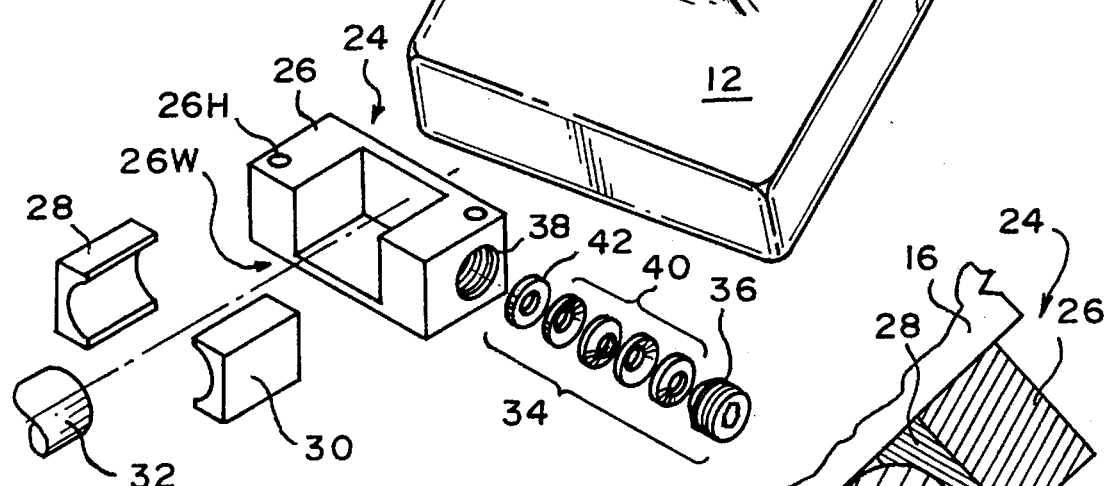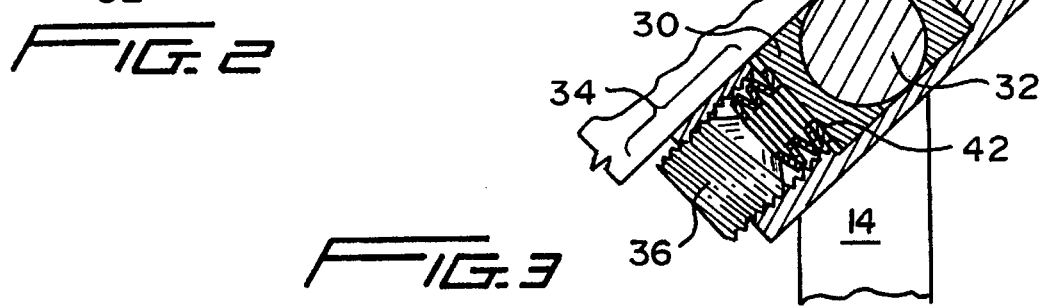

FRICTION TILT MECHANISM

TECHNICAL FIELD

The present invention relates generally to frictional pivoting mechanisms, and more particularly to a precisely controllable friction tilting mechanism providing user-adjustable frictional forces to control its rotation which is ideally adapted to providing precisely controllable viewing angles of flat panel display devices mounted by it.

BACKGROUND

Along with the greatly increased activity centered around personal computer usage in recent years, and particularly due to the near explosive use of laptop, desktop, and notebook computers, there has arisen a corresponding increase in the need for mechanisms directed to facilitating proper viewing of their associated displays. The need for suitable user-controllable viewing angle adjustability of flat panel displays of the LCD and related types is especially acute as these small computers and their displays are used in a wider variety of environments. The use of these displays in homes, offices, or vehicles (trains, planes, etc.) presents previously unencountered difficulties caused by frequently changing viewing angles and ambient lighting conditions. Thus, a set of unique display device mounting conditions and requirements have emerged, some of which are exacerbated by the very light weight and high portability of the flat panel displays themselves. In short, the unusual needs for frequent and precise adjustability of flat panel displays requiring light user touch and high stability of the tilt angle settings present severe challenges for frictionally biased tilt setting mechanisms.

Descriptions of typical prior art approaches to user-operated display tilt devices may be found in a number of U.S. patents.

U.S. Pat. Nos. 5,333,356 to Katagiri and 4,770,382 to Lehti both disclose apparatus for controlling the viewing angles of display panels utilizing spring-biased mechanisms to impart frictional loading to their rotational elements. In the '832 patent, a supporting arm or rod applies variable tension via a pivot journal to a slide part on which a flat panel display is mounted. In the '356 patent, rotating friction is applied to a hinge pin-like pivot element via interiorly positioned frustro-conical surfaces. Both of these patents show the use of Belleville springs as part of their urging mechanisms.

U.S. Pat. No. 5,509,176 to Karl teaches an entirely different approach to flat panel viewing angle settings using a torque hinge wherein an interference fit of a coated shaft inserted within the housing cavity produces constant resistance through the hinge's range of motion. Coating materials are recited as being MCU foam, Teflon, or silicone.

Other U.S. patents of general interest for their early teachings of basic frictional hinge pin assemblies are U.S. Pat. Nos. 3,239,874 to Sperzel and 3,357,041 to Brueder. In the '874 patent, a screw plug presses directly against a single nylon block to urge a hinge pin against its housing sleeve to provide the controlled friction.

Therefore, it is clear that as the needs for precisely controllable and long service life frictional tilt mechanisms increase, there are significant improvements to existing devices yet to emerge. It is precisely these more stringent needs for operating smoothness coupled with long-term stability, as well as simple and precise user adjustability, that the present frictional tilt mechanism admirably provides.

OBJECTS OF THE INVENTION

It is therefore a primary object of the present invention to provide an improved frictional pivoting mechanism based on smooth and precise adjustability of input forces to achieve highly controllable rotational friction over a wide range of operating conditions.

A further object of the present invention is to provide improved frictional pivoting mechanisms having user-adjustable frictional force to control its rotation, to provide improved and consistent static and dynamic operation of the mechanism over its useful life.

A yet further object of the present invention is to provide a frictional pivoting mechanism having uniquely formed and configured frictional applying elements, adapted to provide precisely controllable static and dynamic rotation of the mechanism and any elements affixed to it over a greatly extended operational life.

A still further object of the present invention is to provide a controllable frictional pivoting mechanism to smoothly set and securely maintain the desired viewing angle (or tilt angle) of a wide range of flat panel displays.

In a preferred embodiment configured to provide smoothly controllable tilt angles to a flat panel LCD-type display, a pair of friction tilt devices assembled as a combined friction tilt mechanism are rotatingly disposed at opposite ends of a shaft that is affixed at its mid-section to a top portion of a vertical support member. The vertical member is supported at its lower end by a horizontal base member, thus implementing a desktop capability of providing the desired tilt angle adjustments for display panels mounted to the tilt devices. Each friction tilt device includes a pair of bearing blocks that straddle the shaft and apply precisely controllable amounts of friction to the resulting rotating joints. A threaded set screw acting through an array of calibrated Belleville springs contained in the housing of each friction tilt device produce finely controllable compressive forces that impart the desired degree of friction to the shaft/bearing block elements. The structures employed allow an extremely wide range of friction settings, including levels allowing the joint to be fixed at any desired tilt angle. Small angle positioning of the illustrative flat panel display is greatly facilitated because the static friction of the rotating joints are not substantially greater than the rotational/sliding friction.

BRIEF DESCRIPTION OF THE DRAWINGS

Additional objects and advantages of the invention will become apparent to those skilled in the art as the description proceeds with reference to the accompanying drawings wherein:

FIG. 1 is a top rear perspective view of a typical display mounting stand showing a preferred arrangement for a friction tilt mechanism configured according to the present invention;

FIG. 2 is an exploded view of a single friction tilt device according to the present invention; and FIG. 3 is a cross-sectional view taken through a central longitudinal plane of a friction tilt device shown in actual use tiltably coupling a display device to a vertical support member.

BEST MODE FOR CARRYING OUT THE INVENTION

Referring now to FIG. 1, there is shown an illustrative display mounting stand which may advantageously incorporate the advanced features provided by the present friction tilt mechanism invention. The particular stand picture is adapted to provide desktop or counter mounting for an LCD active matrix display, and is described in a Datalux Corporation (Winchester, Va. 22602) Engineering Bulletin EID 1020. A wide range of other mounting devices and stands may, of course, also serve to carry the adjustable friction tilt mechanism invention described hereinbelow.

A desktop display mounting stand 10 is shown as including a base member 12, which rigidly carries a vertical support member 14. The mounting stand 10 tiltably supports a display panel 16 via a friction tilting mechanism 18. The display panel 16 may house well-known active matrix LCD elements, plus their supporting electronics, and forms no part of the present invention. It is shown in phantom in a number of tilt positions. A pair of friction tilt devices to be described below are shown symmetrically disposed about a pivoting shaft affixed to an upper edge of a reduced width portion 20 of the vertical support member 14. In use, the flat panel display 16 and friction tilt devices are arranged to be rotatable about a primary tilt axis 22.

Referring now to FIGS. 2 and 3 there are shown, respectively, an exploded view of a single friction tilt device and a cross-sectional view of the same device, both according to the teachings of the present invention. The friction tilt device may be used in pairs, as in a preferred embodiment depicted in FIG. 1, or may be used singly. When used in pairs, the friction tilt devices may be formed to exhibit mirror image symmetry, both versions functioning identically. A friction tilt device 24 includes a housing 26 into which is formed a rectangular well portion 26W, and one or more mounting holes 26H. Within the four-sided well 26W there is fitted a pair of bearing blocks 28 and 30 symmetrically disposed around one end of a pivot shaft 32. The pivot shaft 32 includes a centrally located longitudinal axis 22 which coincides with the primary tilt axis. In use, the block 28 remains stationary in the housing well 26W while the block 30 moves slightly under the urging of precise compressive force applying means 34, thereby jointly applying highly controllable friction to the pivot shaft 32 via the suitable curved contacting faces of the blocks 28 and 30. With brief reference again to FIG. 1, it is seen that the pivot shaft 32 is securely affixed to the vertical support member 14. As best seen in FIG. 3, a display panel 16 securely affixed to the housing 26 via the mounting holes 26H may thus have its viewing angle precisely adjusted in tilt with respect to the vertical support member 14.

The precise force applying means 34 consists of a set screw 36 threadedly inserted into a threaded opening 38 formed into the housing 26 at right angles to the tilt axis 22, as well as a plurality of Belleville springs 40 and a hardened metallic disk washer 42. In use, small manual rotational adjustments by the user to the set screw 36 applies increments of displacement to the array of Belleville springs 40, which in turn apply their finely calibrated compressive forces via disk washer 42 to the flat face of movable bearing block 30. Beyond these baseline features, a number of additional improvements are incorporated into the friction tilt device 24 to significantly enhance its operational performance, its stability and simplicity in use, as well as its ease of manufacture and initial assembly.

The materials of the bearing blocks and pivot shafts are carefully chosen to exhibit low combined coefficient of friction in order to provide smooth and precise small angle relative motion, thereby permitting precisely controllable viewing angle adjustability. In preferred embodiments, highly machined steel shafts and bronze alloy bearing blocks with smoothly machined curved faces are employed to ensure that their static friction is not substantially greater than their rotating friction, as well as to increase the service life of the devices 24. The ratio of static to rotating friction ideally should approach unity in order to facilitate small tilt angle adjustments. Additionally, the number of Belleville springs and the pitch of the set screws may be selectively varied to accommodate a wide range of display panel sizes, weights, and degrees of mass unbalance, while continuing to maintain user-adjustable ease of precise tilt angle settings. All of these factors act in concert with the device structures as described above to allow a near infinite number of precisely controllable and stably repeatable friction settings and tilt angles. For "fixed" viewing angles, the set screw is merely user-tightened slightly, with no wear or marring of the bearing block due to the intervening springs and hardened disk washer.

Beyond the operating advantages provided by the preferred embodiments described above either as a singly used friction tilt device (of FIGS. 2 and 3), or as a combined friction tilt mechanism (of FIG. 1), a number of manufacturing and assembly advantages also accrue. Via one standard assembly having minimal parts count (as seen best in FIG. 2), combined with the use of more than one assembly, an unusually wide range of display devices may be easily accommodated. Displays weighing mere ounces, or weighing several pounds present no special problems. Mere substitution of Belleville spring values ensures that the proper ranges of forces and frictions are achieved. The split bearing block approach (both may be identical) provides a unique benefit in the way of ease of initial assembly or subsequent field changes by not requiring critical sequencing of parts during assembly.

Although the invention has been described in terms of a preferred embodiment showing viewing angle adjustability about a horizontal pivoting axis for a desktop or counter top mounted display stand, the invention should not be deemed limited thereto, since other embodiments and modifications will readily occur to one skilled in the art. For example, the base member of the display mounting stand of FIG. 1 could be fixedly mounted to a vertical wall to provide either tilt or azimuth angle adjustability about either a horizontal or vertical axis. Also, mounting or shaft arrangements that require only a single friction tilt device in lieu of the pair of devices constituting a friction tilt mechanism shown is also considered to be within the realm of variants contemplated. It is therefore to be understood that the appended claims are intended to cover all such modifications as fall within the true spirit and scope of the invention.

I claim:

1. A user-adjustable friction tilt device for setting and maintaining a controllable amount of rotational friction in said device during use, comprising:

(a) a housing having a rectangular well formed into its central region and a cylindrical opening in communication with said well formed into at least one housing side wall;

(b) a first stationary bearing block having a flat face disposed oppositely to a curved face, said stationary block flat face fitted against a first side wall of said rectangular well;

(c) a second movable bearing block having a flat face disposed oppositely to a curved face, said moveable block flat face fitted against a second side wall of said rectangular well;

(d) said first and second blocks adapted to frictionally engage a pivot shaft therebetween by frictional contact between said shaft and said first and second curved faces; and (e) user-adjustable force applying means disposed within said cylindrical opening for providing calibratable compressive force to said second block flat face, whereby said friction tilt device may be pivoted about said shaft with the rotation between shaft and blocks precisely established responsive to said calibrated compressive force.

2. The user-adjustable friction tilt device of claim 1 wherein said shaft is cylindrical and said first and second block curved faces are frustro-cylindrically shaped.

3. The user-adjustable friction tilt device of claim 1 wherein said rectangular well is formed as a notch-like opening into said housing, with at least three well walls delimiting said well from said housing and at least two well surfaces forming part of the outer surface of said housing.

4. The user-adjustable friction tilt device of claim 3 wherein said at least three well walls include two well side walls and a contiguous well bottom wall, said cylindrical opening oriented at right angles to at least one of said two well side walls.

5. The user-adjustable friction tilt device of claim 1 wherein said force applying means comprises a threaded element adapted to be threadedly inserted into said cylindrical opening to apply compressive forces to said movable block flat face through at least one spring washer.

6. The user-adjustable friction tilt device of claim 5 wherein said threaded element is a set screw and said at least one spring washer is a plurality of Belleville springs having predetermined spring constants.

7. The user-adjustable friction tilt device of claim 6 wherein said force applying means further comprises a hardened disk washer disposed between said Belleville springs and said movable block flat face.

8. The user-adjustable friction tilt device of claim 7 wherein said plurality of Belleville springs includes at least one spring having a first predetermined spring constant and at least a second spring having a second predetermined spring constant.

9. The user-adjustable friction tilt device of claim 8 wherein the pitch of said set screw is established to achieve varied amounts of advance responsive to a predetermined amount of angular rotation.

10. The user-adjustable friction tilt device of claim 1 wherein said first and second blocks are made of bronze alloys to further contribute in part to precisely established static and rotational friction.

11. A user-controllable friction tilt mechanism for smoothly and precisely setting and maintaining the viewing angle of a display device affixed thereto, said mechanism comprising:

(a) a support element for carrying said mechanism and a display affixed thereto;

(b) cylindrical shaft affixed to one end of said support, said shaft having a centrally disposed longitudinal axis constituting a tilt axis of said mechanism;

(c) at least one friction tilt device frictionally engaged for rotation about said shaft, said friction tilt device comprising:

(d) a housing having a rectangular well formed into its central region;

(e) first and second bearing blocks, each having a flat face disposed oppositely to a curved face, said first block fitted stationarily against a first well side wall, said second block fitted moveably against a second well side wall, said first and second blocks adapted to frictionally engage via their curved faces, one end of said shaft inserted therebetween; and (f) user-adjustable force applying means carried within a cylindrical opening formed into at least one side wall of said housing for providing a range of compressive forces to said second block flat face.

12. The user-controllable friction tilt mechanism of claim 11 wherein said shaft is affixed to a central edge portion of said support thereby permitting frictional engagement by said at least one said friction tilt device at either shaft end.

13. The user-controllable friction tilt mechanism of claim 11 wherein said shaft is affixed to a central edge portion of said support, and said at least one friction tilt device is a pair of similar devices, whereby frictional engagement is accomplished by said pair at both shaft ends.

14. The user-controllable friction tilt mechanism of claim 11 wherein said rectangular well is formed as a notch-like opening into said housing, with at least three well walls delimiting said well from said housing, and at least two well surfaces forming part of the outer surface of said housing.

15. The user-controllable friction tilt mechanism of claim 14 wherein said at least three walls include two well side walls and a contiguous well bottom wall, said cylindrical opening oriented at right angles to at least one of said two well side walls.

16. The user-controllable friction tilt mechanism of claim 11 wherein said force applying means comprises a threaded element adapted to be threadedly inserted into said cylindrical opening to apply compressive forces to said second block flat face through at least one spring washer.

17. The user-controllable friction tilt mechanism of claim 16 wherein said threaded element is a set screw and said at least one spring washer is a plurality of Belleville springs having predetermined spring constants.

18. The user-controllable friction tilt mechanism of claim 17 wherein said force applying means further comprise a hardened disk washer disposed between said Belleville springs and said movable block flat face.

19. The user-controllable friction tilt mechanism of claim 18 wherein the pitch of said set screw is established to achieve a varied amount of advance responsive to a predetermined amount of angular rotation.

20. The user-controllable friction tilt mechanism of claim 11 wherein said cylindrical shaft is affixed to a central edge portion of said support and said at least one friction tilt device is a pair of similar devices, whereby frictional engagement is accomplished by said pair at both shaft ends;

and said rectangular well is formed as a notchlike opening into said housing, with at least three well walls delimiting said well from said housing and at least two well surfaces forming part of the outer surface of said housing;

and said force applying means comprises a threaded set screw adapted to be inserted into said cylindrical opening to apply compressive forces to said second block flat face through a plurality of Belleville springs having predetermined spring constants;

and said force applying means further comprises a hardened disk washer disposed between said Belleville springs and said movable second block flat face; and said at least three well walls include two well side walls and a contiguous well bottom wall, said cylindrical opening oriented at right angles to at least one of said two well side walls.

\* \* \* \* \*